(12) United States Patent
Sunyi et al.

(10) Patent No.: US 10,778,027 B2
(45) Date of Patent: Sep. 15, 2020

(54) POWER USAGE PATTERN COLLECTOR AND CHARGING CONTROLLER

(71) Applicant: SONY MOBILE COMMUNICATIONS INC., Tokyo (JP)

(72) Inventors: Imre Sunyi, Helsingborg (SE); Gustaf Loov, Lund (SE)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 15/612,392

(22) Filed: Jun. 2, 2017

(65) Prior Publication Data

US 2017/0353039 A1  Dec. 7, 2017

(30) Foreign Application Priority Data

Jun. 6, 2016 (EP) .................................... 16173106

(51) Int. Cl.
*H02J 7/00* (2006.01)
*H02J 7/14* (2006.01)
(Continued)

(52) U.S. Cl.
CPC .............. *H02J 7/007* (2013.01); *B60L 53/14* (2019.02); *B60L 53/30* (2019.02); *B60L 58/12* (2019.02);
(Continued)

(58) Field of Classification Search
USPC .......................... 320/137, 134, 136, 107, 108
See application file for complete search history.

(56) References Cited

U.S. PATENT DOCUMENTS

2011/0185196 A1* 7/2011 Asano ................. B60L 11/1809
 713/300
2012/0330494 A1* 12/2012 Hendrix .............. B60L 11/1838
 701/29.3
(Continued)

FOREIGN PATENT DOCUMENTS

| EP | 2 752 962 | 7/2014 |
| EP | 2 894 488 | 7/2015 |
| WO | 2013/078541 | 6/2013 |

OTHER PUBLICATIONS

Extended European Search report dated Jan. 5, 2017 for corresponding European application No. 16173106.2.

*Primary Examiner* — Alexis B Pacheco
(74) *Attorney, Agent, or Firm* — Renner, Otto, Boisselle & Sklar, LLP

(57) ABSTRACT

Present invention concerns charging of a power source of a device. A power usage pattern collector is configured to: collect data on power usage in a device, power source of which is chargeable, with regard to at least one particular criterion having influence on power usage in the device; and determine at least one power usage pattern by use of the collected data, said power usage pattern specifying power usage in the device with regard to at least one particular reoccurring criterion. A charging controller is configured to: acquire at least one power usage pattern; and control charging of a power source of a device by use of the at least one acquired power usage pattern. Present invention relates also to corresponding methods, correspondingly arranged computer program products, correspondingly arranged computer-readable recording media, and a system comprising the power usage pattern collector and the charging controller.

7 Claims, 10 Drawing Sheets

(51) Int. Cl.
*H02J 13/00* (2006.01)
*B60L 53/14* (2019.01)
*B60L 58/12* (2019.01)
*B60L 53/30* (2019.01)
*G06F 1/26* (2006.01)
*G06F 1/324* (2019.01)

(52) U.S. Cl.
CPC .............. *G06F 1/266* (2013.01); *G06F 1/324* (2013.01); *H02J 7/0027* (2013.01); *H02J 7/0071* (2020.01); *H02J 13/0079* (2013.01); B60L 2240/80 (2013.01); H02J 2203/20 (2020.01); Y02B 70/3216 (2013.01); Y02E 60/76 (2013.01); Y02T 10/705 (2013.01); Y02T 10/7005 (2013.01); Y02T 10/7044 (2013.01); Y02T 10/7072 (2013.01); Y02T 90/121 (2013.01); Y02T 90/14 (2013.01); Y02T 90/168 (2013.01); Y04S 20/221 (2013.01); Y04S 30/12 (2013.01); Y04S 40/22 (2013.01)

(56) References Cited

U.S. PATENT DOCUMENTS

| | | | |
|---|---|---|---|
| 2013/0106341 A1* | 5/2013 | Eaton | H01M 16/00 320/101 |
| 2014/0184170 A1* | 7/2014 | Jeong | B60L 11/1844 320/137 |
| 2014/0191724 A1* | 7/2014 | Wojcik | H05K 5/0086 320/114 |
| 2015/0042287 A1* | 2/2015 | Liu | H02J 50/90 320/134 |
| 2015/0198676 A1* | 7/2015 | Min | H01F 38/14 320/114 |
| 2015/0329003 A1* | 11/2015 | Li | B60L 58/13 320/134 |
| 2016/0064955 A1* | 3/2016 | Zuerner | H02J 7/007 705/39 |

\* cited by examiner

| 0 | 1 | 2 | 3 | 4 | 5 |
|---|---|---|---|---|---|
| 6 | 5 | 4 | 3 | 2 | 1 |
| 1 | 0 | 0 | 0 | 0 | 0 |

| 6 | 7 | 8 | 9 | 10 | 11 |
|---|---|---|---|---|---|
| 0 | 0 | 0 | 0 | 0 | 0 |
| 3 | 1 | 0 | 0 | 1 | 0 |

| 12 | 13 | 14 | 15 | 16 | 17 |
|---|---|---|---|---|---|
| 0 | 0 | 0 | 0 | 0 | 0 |
| 5 | 5 | 3 | 3 | 2 | 2 |

| 18 | 19 | 20 | 21 | 22 | 23 |
|---|---|---|---|---|---|
| 0 | 0 | 0 | 0 | 8 | 7 |
| 1 | 1 | 4 | 4 | 1 | 0 |

FIG. 9a

POWER USAGE PATTERN COLLECTOR AND CHARGING CONTROLLER

TECHNICAL FIELD

The present invention relates to charging of a power source of a device. Especially, the present invention relates to components, system, methods, computer program products, and computer-readable recording media supporting the charging of the power source.

BACKGROUND

Batteries often hold characteristics for charging while also preventing battery cells from ageing. The natural desire of getting a battery fully charged and of a fast charging often contravenes characteristics of the particular battery.

For example, some batteries will have a longer lifetime if they are fully discharged occasionally. Other batteries degrade more while fully charged than if they are only 40% charged. Some batteries age faster when charged outside certain ranges (e.g., outside 30% to 80%).

The current battery charging systems or devices take into account characteristics of individual batteries. However, the current battery charging systems or devices often charge batteries up to the full level. In view of the presence of the above-indicated preferred characteristics for operating a battery, e.g., in view of the presence of a charge range, for each battery, that is optimal for operating the respective battery (i.e., which avoids a fast ageing that may occur when exceeding the comfort charge level range of the battery and which is also referred to as "over-charging" in the following), the general charging of batteries up to the full level is an easy strategy which, however, reduces battery life over time due to increased wear.

Thus, an improved charging approach for charging power sources such as batteries is desired that executes a more intelligent charging. Additionally, a charging approach is desired that takes into account also the individual and specific use of the power source (e.g., the power consumption and/or the charging), said use being dependent, for example, on the behaviour of the device, to which the power source provides the power, and/or on the behaviour of the user or operator of the device.

SUMMARY

The present invention enables an intelligent charging of power sources (e.g., batteries) as desired. The general idea of the present invention is to monitor power use behaviour of the device of which a power source is chargeable and to control the charging process in view of the monitored power use behaviour. Here, "power use" comprises power consumption and/or charging of the power source. Thus, the monitored power use behaviour comprises monitored power consumption and/or monitored charging of power source (e.g., charging times, charging duration, etc.). Further, when controlling the charging process, besides the monitored behaviour, also characteristics of the power source to be charged are taken into consideration. In this way, an intelligent power source charging approach is provided that avoids power source overloading and, thus, also avoids ageing of chargeable power sources.

The present invention refers at least to a power usage pattern collector, to a charging controller, and to a system comprising the power usage pattern collector and/or the charging controller. Further, the present invention refers to corresponding methods, computer program products, and computer-readable recording media as specified in independent claims. The further arrangements of the present invention are exemplary specified in dependent claims as well as in the following description and attached figures.

The present invention relates to a power usage pattern collector that is configured to: collect data on power usage in a device, power source of which is chargeable, with regard to at least one particular criterion having influence on power usage in the device; and determine at least one power usage pattern by use of the collected data, said power usage pattern specifying power usage in the device with regard to at least one particular reoccurring criterion.

As mentioned, according to the present invention, "power use" comprises power consumption and/or charging of the power source. Thus, a "power usage pattern" comprises a pattern of power consumption in the device, which includes a chargeable power source, and/or a pattern of power consumption in the device. According to an embodiment of the present invention, the power consumption or the charging of the power source individually is monitored for generating at least one power usage pattern. According to a further embodiment, both the power consumption and the charging of the power source are monitored for generating at least one power usage pattern.

According to an embodiment, the power usage pattern collector is configured to provide the at least one power usage pattern to a charging controller for controlling charging of the power source of the device.

According to an embodiment, the at least one particular criterion comprises at least one of the following: at least one particular time; at least one particular location of a user of the device and/or of the device; at least one particular environment of a user of the device and/or of the device; at least one particular state of the user of the device and/or of the device; at least one particular event of the user of the device and/or in the device; at least one particular activity of the user of the device and/or in the device; at least one particular charging time; at least one particular charging duration; time period between two particular charging times; power amount consumed between two particular charging times.

According to an embodiment, the data on power usage in the device specifies at least one of the following with regard to some or each of the at least one particular criterion having influence on power usage in the device: change of used power amount; used power amount.

According to an embodiment, the power usage pattern collector is further configured to at least partially receive the data on power usage in the device from the device and/or from a further device that is external to the device.

According to an embodiment, the power usage pattern collector is configured to determine at least one power usage pattern by: determining at least one reoccurring criterion in the collected data on power usage in a device; and generating the at least one power usage pattern for an individual reoccurring criterion or for a group of interrelated reoccurring criteria.

According to an embodiment, the power usage pattern collector is further configured to generate a group of interrelated reoccurring criteria if at least two reoccurring criteria are detected as influencing together the power usage in the device.

According to an embodiment, a criterion is determined as a reoccurring criterion if the criterion has essentially the same influence on power usage in the device with each reoccurrence.

The present invention refers also to a method for power usage pattern collecting, said method comprising steps of: collecting data on power usage in a device, power source of which is chargeable, with regard to at least one particular criterion having influence on power usage in the device; and determining at least one power usage pattern by use of the collected data, said power usage pattern specifying power usage in the device with regard to at least one particular reoccurring criterion. In general, the method is executed by the power usage pattern collector as described herein. Thus, the method comprises in general steps that are executed by the power usage pattern collector and that are described in the present application.

Further, the present invention refers to a charging controller that is configured to: acquire at least one power usage pattern; and control charging of a power source of a device by use of the at least one acquired power usage pattern.

According to an embodiment, the acquiring of the at least one power usage pattern comprises a reception of the at least one power usage pattern from a power usage pattern collector.

According to an embodiment, the charging controller is configured to: acquire data indicating information on at least one currently satisfied criterion having influence on power usage in a device and/or on at least one future criterion that will be satisfied in future and has influence on power usage of the device; and/or acquire characteristics of the power source to be charged; wherein the charging controller is further configured to control charging of the device by use of the acquired data and/or acquired characteristics of the power source to be charged.

According to an embodiment, the charging controller is configured to control charging of the power source by executing the following by use of the at least one acquired power usage pattern or by use of the acquired data and/or the acquired characteristics of the power source to be charged in addition to the use of the at least one acquired power usage pattern: dividing a particular future time period into a plurality of sub-periods of time; determining, for each sub-period of time, an assumed remaining average charging duration; determining, for each sub-period of time, an assumed average power use; and selecting at least one time block of sub-periods of time for charging the power source such that, after charging in the time block: sufficient power is provided for use by the device until a next assumed charging time; and/or the power source is operated as long as possible with regard to preferred characteristics of the power source until the next assumed charging time.

According to an embodiment, the at least one acquired power usage pattern comprises a power usage pattern that is currently satisfied and/or wherein the at least one acquired power usage pattern comprises a power usage pattern that will be satisfied in a time period from the current time up to a pre-determined time.

The present invention refers also to a method for charging control, said method comprising steps of: acquiring at least one power usage pattern; and controlling charging of a power source of a device by use of the at least one acquired power usage pattern. In general, the method is executed by the charging controller as described herein. Thus, the method comprises in general steps that are executed by the charging controller and that are described in the present application.

The present invention refers also to a computer program product comprising computer readable program code that is configured to cause a computing device to execute steps of at least one of the methods introduced above and described in more detail below. According to an embodiment, the computer readable program code is embodied in a computer-readable medium. According to a further embodiment, the computer-readable medium is a non-transitory computer-readable medium. According to an embodiment, the computing device is a processor or any other computer configured to execute computer readable program code.

Moreover, the present invention refers also to a computer-readable recording medium configured to store therein the above-introduced computer program product. According to an embodiment, the computer-readable medium is a non-transitory computer-readable medium.

Furthermore, the present invention refers to a system comprising a power usage pattern collector as described herein and/or a charging controller as described herein.

BRIEF DESCRIPTION OF THE DRAWINGS

In the following, embodiments of the present invention are described with reference to accompanying drawings in which the same or similar reference numerals designate the same or similar elements.

FIG. 9a shows sub-periods of time provided according to an embodiment of the present invention.

DETAILED DESCRIPTION OF EMBODIMENTS

In the following, exemplary embodiments of the present invention are described with reference to the attached drawings. Features of the various embodiments may be combined with each other unless specifically stated otherwise.

Figure 1A:
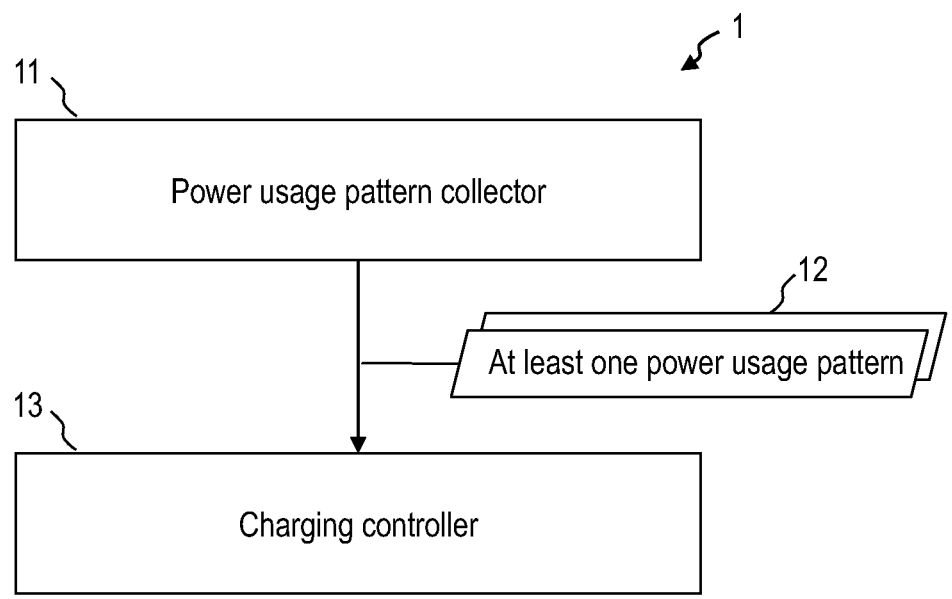
FIG. 1a shows an exemplary arrangement of a system according to an embodiment of the present invention.

FIG. 1a shows an exemplary arrangement of a system 1, arranged for supporting charging of a power source of a device, according to an embodiment of the present invention. According to the embodiment of FIG. 1a, the system comprises both a power usage pattern collector 11 and a charging controller 13. Each of components 11, 13 is arranged for supporting charging of a power source of a device in a more intelligent way. I.e., the charging is supported such that over-charging of the power source is avoided. Additionally, the ageing of the charged power source is reduced. By each of components 11, 13, a charging is executed that takes into account one or more criteria influencing power usage in the device and/or characteristics of device's power source to be charged.

According to the present embodiment, power usage pattern collector 11 and charging controller 13 are connected to each other directly (i.e., without presence of intermediate components, entities, devices, and/or systems etc. for establishing and maintaining the connection) or indirectly (e.g., via further components, entities, devices, and/or systems etc.). The connection is used for communication purposes, i.e. for sending/transmitting and/or receiving data and/or signals. The connection comprises a wireless and/or wired connection. In FIG. 1a, a communication and particularly a transmission of at least one power usage pattern 12, generated by power usage pattern collector 11, from power usage pattern collector 11 to charging controller 13 is illustrated exemplary. The transmission can be a direct or indirect transmission. Additionally, the transmission can be implemented as a wireless and/or wired transmission. Wherein a combination of both the wireless and the wired technique will be more often used in case of indirect transmission, where each communication from or to an intermediate component of the connection can be a wired or a wireless connection.

Figure 1B:
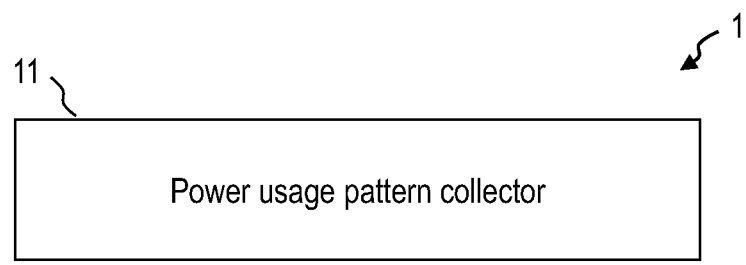
FIG. 1b shows an exemplary arrangement of a system according to an embodiment of the present invention.

FIG. 1b shows an exemplary arrangement of a system 1, arranged for supporting charging of a power source of a device, according to an embodiment of the present invention. According to the embodiment of FIG. 1b, system 1 comprises power usage pattern collector 11 only. The charging controller 13 is located outside the system or device 1.

Figure 1C:
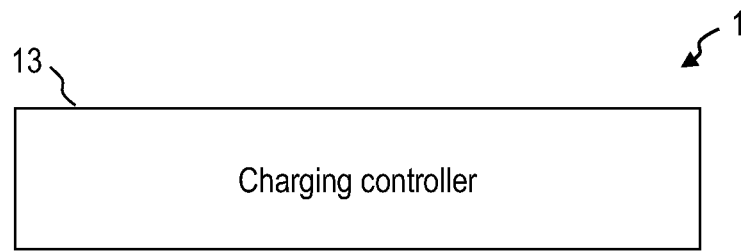
FIG. 1c shows an exemplary arrangement of a system according to an embodiment of the present invention.

FIG. 1c shows an exemplary arrangement of system 1, arranged for supporting charging of a power source of a device, according to an embodiment of the present invention. According to the embodiment of FIG. 1c, system 1 comprises charging controller 13. The power usage pattern collector 11 is located outside system or device 1.

It has to be noted, that also embodiments of FIGS. 1b and 1c allow a connection between power usage pattern collector 11 and charging controller 13 as shown exemplary in FIG. 1a. Also according to embodiments of FIGS. 1b and 1c, a communication between power usage pattern collector 11 and charging controller 13, as described exemplary herein, is permitted and executed.

According to an embodiment, system 1, as shown in any one of FIGS. 1a to 1c, is an arrangement of several individual components not necessarily comprised in a common housing. According to another embodiment, system 1, as shown in any one of FIGS. 1a to 1c, is a device comprising a housing, wherein the components of the device 1 are arranged within the housing.

The device, the power source of which is chargeable, may be any kind of devices that is energy or power consuming and that has an internal and/or an external power source, which has to be charged. According to an embodiment, the device is a communication device, i.e. a device that is connectable to other devices for executing data and/or signal communication (i.e., transmission and/or reception). As a communication device, the device is configured to execute wired and/or wireless communication. According to an embodiment, the communication is executed via a communication network (e.g., cellular network, WiFi network, Bluetooth, etc.). The system 1, exemplary shown above and explained herein, may be fully or partially integrated in the device, power source of which is chargeable. Further, according to an embodiment, the device is a mobile device, wherein, according to another embodiment, the device is a stationary device.

According to an embodiment, both power usage pattern collector 11 and charging controller 13 are parts of the device with the chargeable power source. According to another embodiment, power usage pattern collector 11 or charging controller 13 is a part of the device with the chargeable power source. According to a further embodiment, power usage pattern collector 11 and charging controller 13 and, thus, system 1 are external to the device with the chargeable power source.

Figure 2:
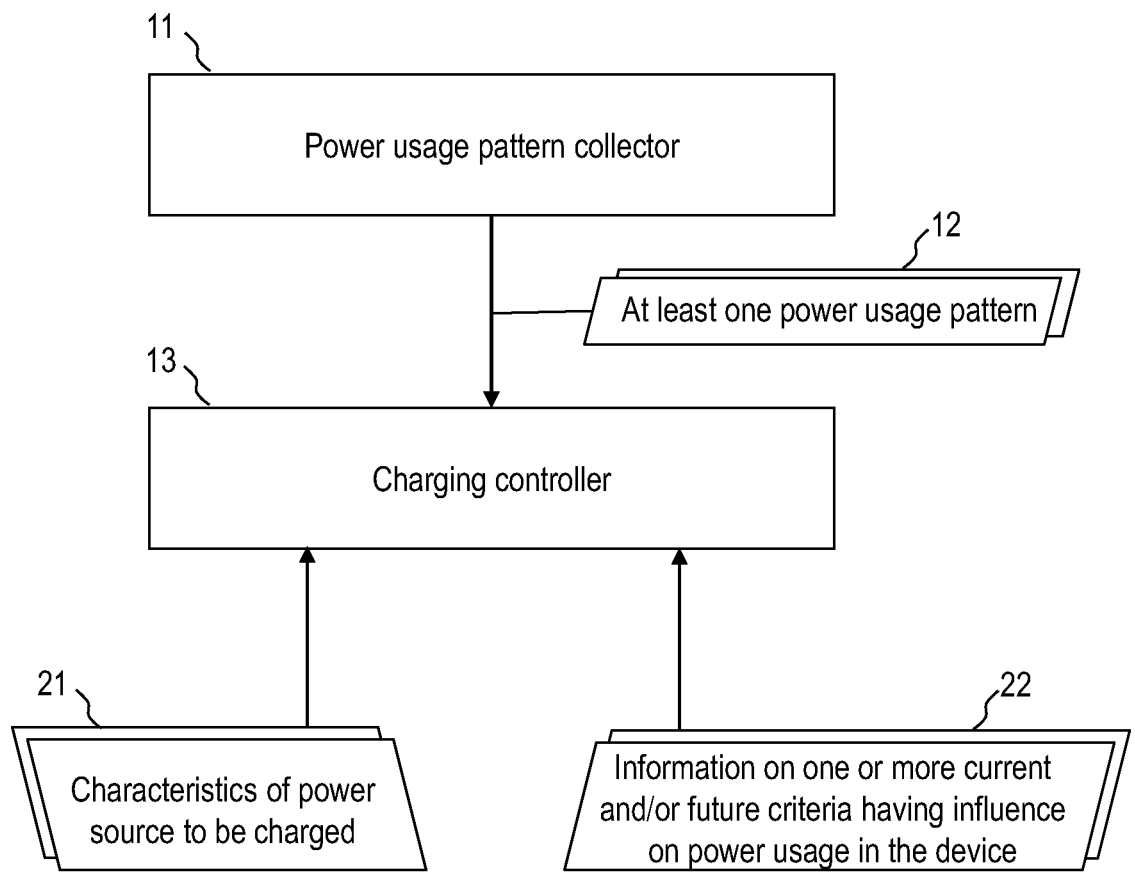
FIG. 2 shows an exemplary arrangement of a power usage pattern collector and a charging controller according to an embodiment of the present invention.

FIG. 2 shows an exemplary arrangement of power usage pattern collector 11 and charging controller 13 according to an embodiment of the present invention. Any of the embodiments of FIGS. 1a to 1c can be taken as a basis for the arrangement of FIG. 2. According to embodiment of FIG. 2, besides the at least one power usage pattern 12, provided by power usage pattern collector 11, charging controller 13 acquires or gathers also characteristics 21 of the power source (e.g., battery) to be charged and/or information on one or more currently satisfied criteria and/or on one or more future (e.g., planned and/or expected) criteria that will/might be satisfied in the future, said one or more criteria having influence on the power usage of the device with the chargeable power source. Thus, charging controller 13 of FIG. 2 takes more information into account for controlling the charging of the power source.

According to an embodiment, characteristics 21 of the power source comprise at least one of the following: at least one optimal charging range, i.e. a range of charging in which the ageing of the power source is reduced when the power source is operated in said range; at least one charging range that should be avoided, i.e. a range of charging in which the ageing of the power source is accelerated or speeded up when the power source is operated in said range. Characteristics 21 may be known with regard to the respective power source in advance, i.e. may be pre-determined. According to an embodiment, the characteristics of the power source are pre-determined by the manufacturer of the respective power source.

Figure 3:
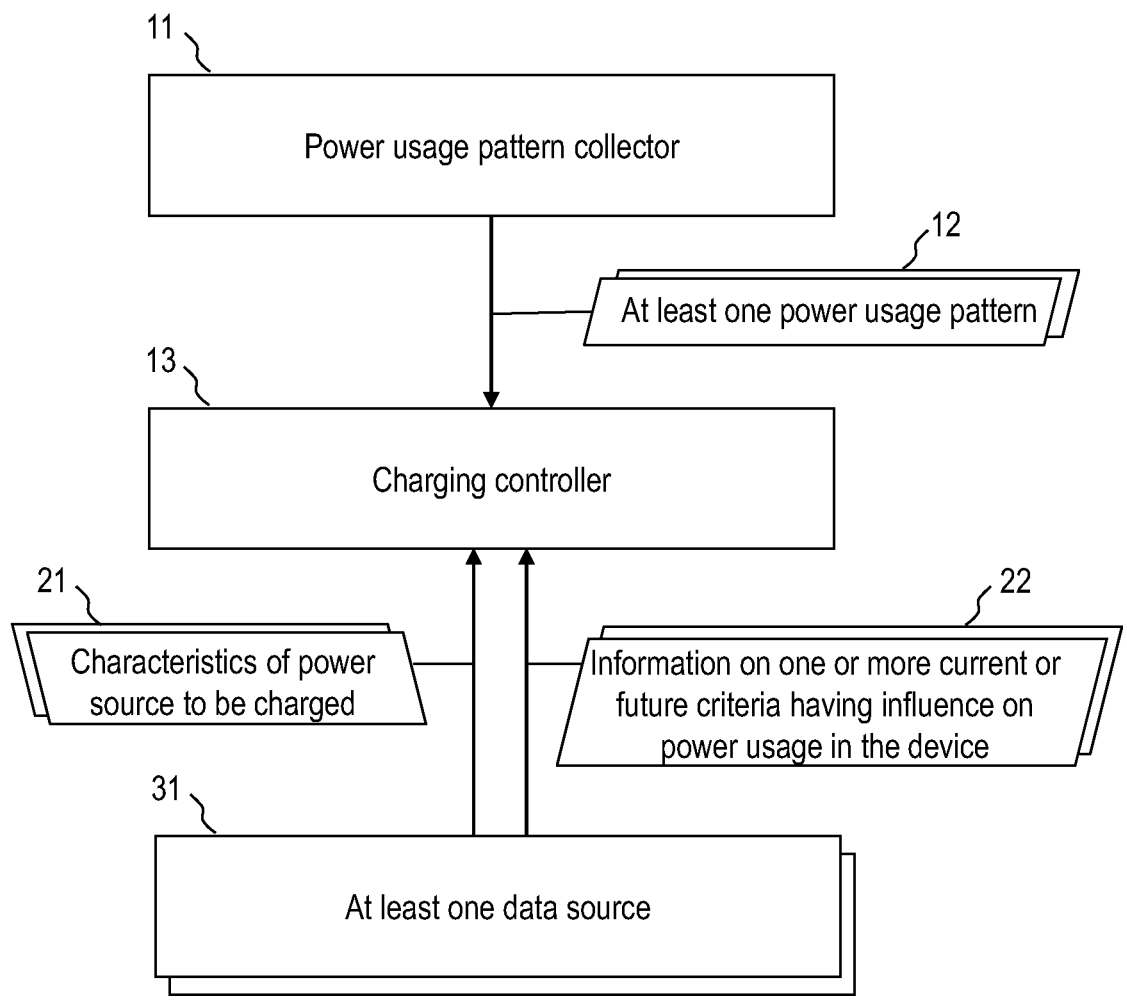
FIG. 3 shows an exemplary arrangement of a power usage pattern collector and a charging controller according to an embodiment of the present invention.

FIG. 3 shows an exemplary arrangement of power usage pattern collector 11 and charging controller 13 according to an embodiment of the present invention. The embodiment of FIG. 3 is based on the embodiment of FIG. 2. According to embodiment of FIG. 3, charging controller 13 is arranged to receive the characteristics 21 and/or the information on one or more current and/or future criteria 22 influencing the power usage in the device from at least one data source 31. According to an embodiment, characteristics 21 and one or more current and/or future criteria 22 are received from different data sources 31. According to another embodiment, characteristics 21 and one or more current and/or future criteria 22 are received from the same at least one data source 31, or the data sources 31 overlap, i.e. at least one of the data sources 31 provides both power source characteristics 21 and one or more current and/or future criteria 22.

As shown above, the present invention allows different arrangements of system 1 that is configured to support charging of a power source of a device. Further, the present invention allows various locations of data sources providing data and/or information to power usage pattern collector 11 and/or charging controller 13. According to an embodiment, power usage pattern collector 11 is located external to the device with the chargeable power source, according to another embodiment power usage pattern collector 11 is located within said device. Data and/or information, required by power usage pattern collector 11 for determining one or more power usage patterns 12, is provided according to an embodiment by the device with the chargeable power source. According to another embodiment, power usage pattern collector 11 receives or acquires said data and/or information from at least one further device. Further, also combination of both embodiments is possible, according to which power usage pattern collector 11 receives or acquires said data and/or information from at least one further device and/or from the device with the chargeable power source.

In the following, power usage pattern collector 11 as introduced above is explained in more detail.

Figure 4A:
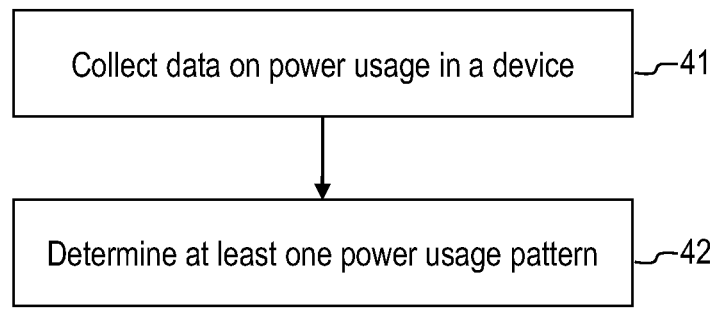
FIG. 4a shows steps or activities executed by a power usage pattern collector according to an embodiment of the present invention.
Figure 4B:
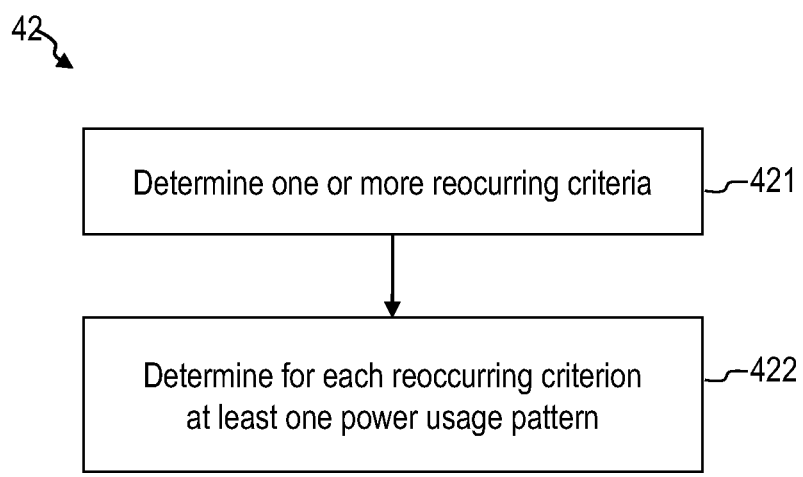
FIG. 4b shows steps or activities executed by a power usage pattern collector according to an embodiment of the present invention.

FIGS. 4a and 4b show steps or activities executed by power usage pattern collector 11 according to an embodiment of the present invention. In step 41, power usage pattern collector 11 collects data on power usage in a device having a power source that is chargeable.

Figure 5:
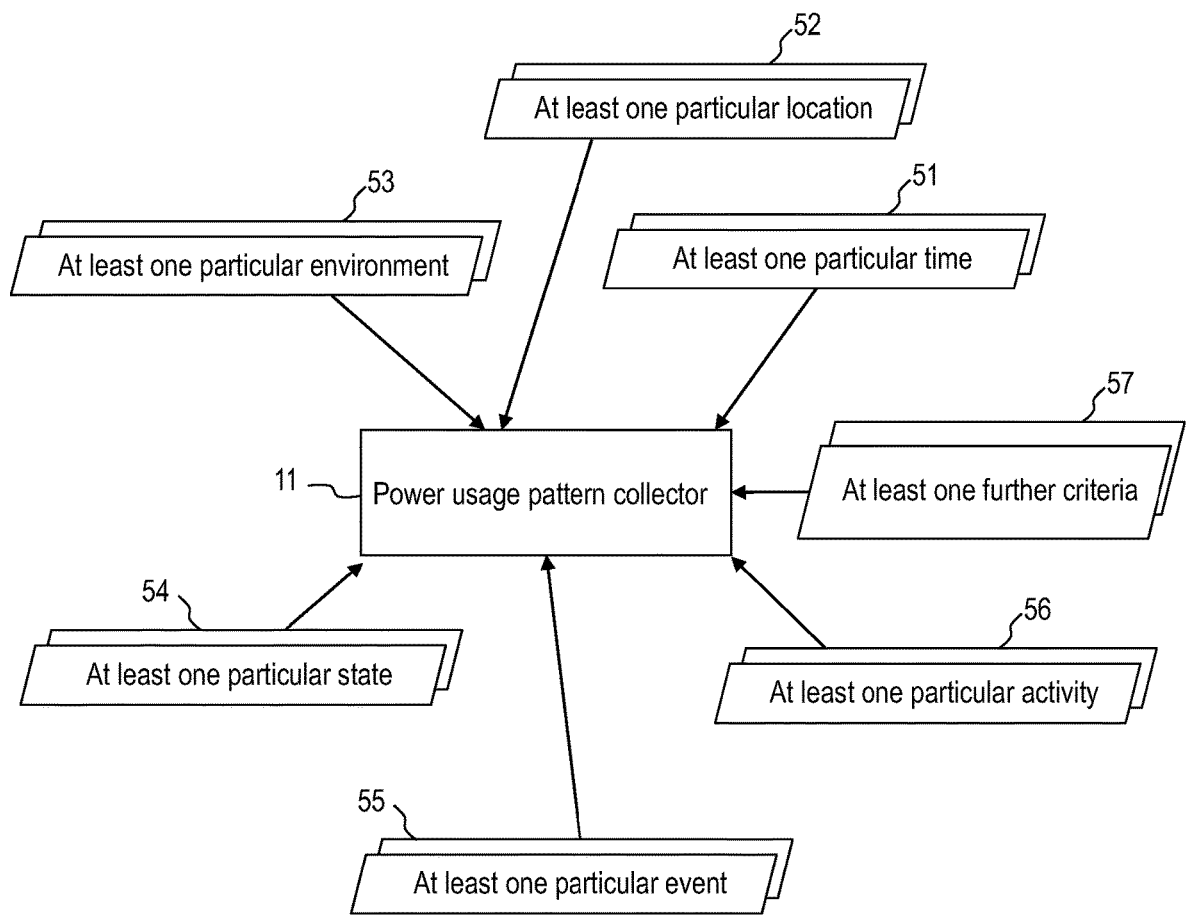
FIG. 5 shows examples of data on power usage in a device, having a power source that is chargeable, said data being collected by a power usage pattern collector according to an embodiment of the present invention.

FIG. 5 shows examples of data on power usage in a device, having a power source that is chargeable, said data being collected 41 by power usage pattern collector 11 according to an embodiment of the present invention.

For example, at least one particular time 51 is associated with particular power use by the device, e.g., with a particular power consumption in the device (e.g., consumption of particular power amount) or with a power charging of the device. Thus, power usage collector 11 collects 41 data on time(s) 51, at which particular power amounts are used (e.g., consumed or charged) in the device.

According to the embodiment of FIG. 5, power usage collector 11 collects 41 data on one or more locations 52, at which a particular power use (e.g., consumption or charging of particular power amount) by the device has been detected. The one or more locations can be determined by one or more typical position or location determination methods as generally known. Each of the one or more locations 52 specify a location 52 of the user of the device and/or of the device.

According to the embodiment of FIG. 5, power usage collector 11 collects 41 data on one or more environments 53, at which a particular power use (e.g., consumption or charging of particular power amount) by the device has been detected. The environments may refer, for example, to cafés, cinemas, train, office etc. The presence of a particular environment can be determined, for example, by one or more typical position or location determination methods as generally known when combined with information on the determined position or location (e.g., café, cinema, office, shop, etc.). The presence of a particular environment can be further determined, for example, by analysis of information like calendar or messages indicating the environment of the device and/or of the user of the device. E.g., if calendar indicates a visit to the cinema at a particular time, the user of the device will be in the cinema at that time, and in view of this environment of the user, the power consumption will be usually low. Each of the one or more environments 53 specifies user's and/or device's environment.

According to the embodiment of FIG. 5, power usage collector 11 collects 41 data on one or more states of the user of the device and/or of the device, at which a particular power use (e.g., consumption or charging of particular power amount) by the device has been detected. A state may be, for example, a sleep state, in which a low power consumption is usually awaited.

According to the embodiment of FIG. 5, power usage pattern collector 11 collects 41 data on one or more particular events 55 of the user of the device and/or in the device and having influence on power use (e.g., consumption or charging of particular power amount) in the device.

According to the embodiment of FIG. 5, power usage collector 11 collects 41 data on one or more activities 56 of the user of the device and/or in the device at which a particular power use (e.g., consumption or charging of particular power amount) by the device has been detected. E.g., if it is detected that the user listens to the music via the device and/or that the device is executing an application for playing music, an increased amount of power consumption can be awaited.

Further, according to the embodiment of FIG. 5 and according to further embodiments, power usage collector 11 is configured to collect 41 also further data on one or more criteria or things 57 that have influence (e.g. that have been detected as hawing influence) on power use in the device having a chargeable power source. For example, power usage collector 11 is configured to collect 41 at least one of the following: at least one particular charging time; at least one particular charging duration; time period between two particular charging times; power amount consumed between two particular charging times.

According to the present embodiment, the collected 41 data on power usage in the device specifies at least one of the following with regard to some or each of the at least one particular criterion (e.g., criteria 51 to 56 and/or further criteria 57 as mentioned above) having influence on power usage in the device: change of used power amount; and/or used power amount. For example, each a sleep state (see criterion 54) and a music listening activity (see criterion 56) contribute to a particular change of used power amount in the device. While in the sleep state (see criterion 54) the power use will decrease within a certain percentage range, during the music listening activity (see criterion 56) the power use will increase within a certain percentage range. The change of the used power amount in the device can be expressed as at least one of the following: a percentage value, a percentage range, a particular start value or range, a particular end value or range, a difference between a particular start value or range and a particular end value or range. The amount of the used power can be given as a value or as a range.

According to an embodiment, the data is provided to power usage pattern collector 11 as a result of particular calculating and/or determining processes. Said processes comprise, for example position/location determining and/or analysis of further data relating to the device and/or to the user of the device. Said further data comprise, for example, alarms, calendar entries/appointments, weather forecast, road maintenance, applications executed in the device, and/or events occurring in the device, etc.

The collected data refers to one or more criteria or things 51 to 57 that have already taken place, i.e. to past one or more criteria or things 51 to 57, and to one or more criteria or things 51 to 57 with regard to which certain change or stability of the power use in the device with chargeable power source has been observed and/or detected.

According to an embodiment, if a power use (e.g., consumption) changes (e.g., increases or decreases), the cause or reason for the change is detected. Usually, the cause or reason will be occurrence of one of the above exemplary mentioned criterion 51 to 57 (e.g., listening to the music, execution of particular application(s)). According to an embodiment, if a power use (e.g., consumption or charging) remains stable (e.g., does not change or does not change within a particular range), the cause or stability for the stability is detected. Usually, the cause or reason will be occurrence of one of the above exemplary mentioned criterion 51 to 57 (e.g., sleep state). In both cases, the detected criteria and the detected influence on power use in the device with chargeable power source will be collected and monitored.

By use of the collected data, at least one power usage pattern 12 is determined in step 42 by power usage pattern collector 11. The determining 42 of patterns 12 refers to an identification or calculation of patterns 12 in the power use of the device with the chargeable power source. According to an embodiment, a pattern recognition is executed. The execution of the pattern recognition is done, for example, by utilizing at least one of known pattern recognition methods. Such methods are used, for example, in the area of machine learning. In particular, the determining 42 of patterns 12 refers to a recognition of patterns and regularities in the collected data.

FIG. 4b shows sub-steps of said determining 42 of at least one power usage pattern 12 according to an embodiment of the present invention. According to the embodiment of FIG. 4b, one or more reoccurring criteria 51 to 57, having influence on power use in the device with the chargeabe power source, are determined within the collected data in step 421.

According to an embodiment, in said step 421, at least two determined reoccurring criteria are grouped if they are interrelated, i.e. if the criteria influence together the power consumption of the device. For example, if power usage pattern collector 11 detects that regularly at a particular time an application for playing music is started and executed and that a particular power amount is consumed at that time and with regard to that music playing, the corresponding time criterion and the corresponding activity criterion may be grouped. Additionally, if, for example, power usage pattern collector 11 detects that said music playing activity at said time is done in a train, also the corresponding environment criterion "train" is added to the group.

After the determination 421 of reoccurring criteria having influence on power use in the device with chargeable power source, for each reoccurring criterion and, in case of presence of at least one group of reoccurring criteria, for each group of reoccurring criteria, power usage pattern collector 11 determines a corresponding power usage pattern 12 in step 422. Power usage pattern 12 is determined in step 422 such that it comprises: the reoccurring criterion or the group of reoccurring criteria; and an indication on influence on power use in the device by the reoccurring criterion or the group or reoccurring criteria. According to an embodiment, the indication on influence comprises: an indication of change of used power amount, as explained above; and/or an indication of used power amount, as explained above. Both the change of used power amount and the used power amount refer to the corresponding reoccurring criterion or the corresponding group of reoccurring criteria of the respective pattern 12.

As can be gathered from the aforesaid, a criterion is determined as reoccurring criterion if the criterion has essentially the same influence on power use in the device with each reoccurrence. The expression "essentially the same" means that the change of used power amount and/or the used power amount may deviate within or with regard to predetermined borders or thresholds (e.g., an upper and/or a lower threshold).

In the following, charging controller 13 as introduced above is explained in more detail.

Figure 6:
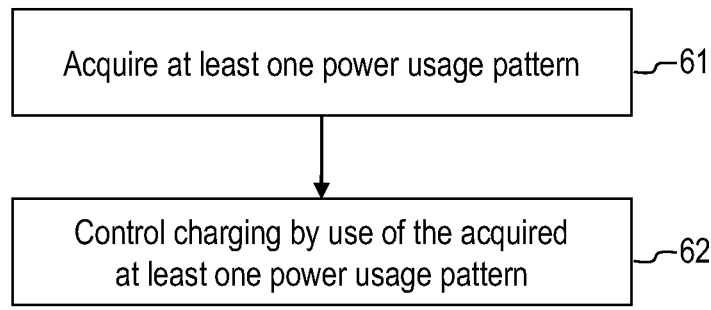
FIG. 6 shows steps or activities executed by a charging controller according to an embodiment of the present invention.

FIG. 6 shows steps or activities executed by charging controller 13 according to an embodiment of the present invention. According to FIG. 6, in step 61, at least one power usage pattern 12 is acquired by charging controller 13. The acquiring 61 of one or more power usage patterns 12 comprises, for example, a reception of the one or more patterns 12 from power usage pattern collector 11.

The reception of pattern(s) 12 is executed, according to an embodiment, in response to a power usage pattern request transmitted by charging controller 13 to power usage pattern collector 11. According to an embodiment, charging controller 13 transmits a power usage pattern request to power usage pattern collector 11 if charging controller 13 detects or has detected that charging of a power source of a device has to be executed and, thus, controlled by charging controller 13. According to an embodiment, charging controller 13 indicates in the request the device, power source of which has to be charged. Power usage pattern collector 11 receives the request from charging controller 13 and transmits one or more power usage patterns 12 of the device, power source of which is to be charged. Charging controller 13 receives said one or more power usage patterns 12.

In response to the acquiring 61 of one or more power usage patterns 12, charging controller 13 controls charging of the power source by use of the acquired at least one power usage pattern.

Figure 7:
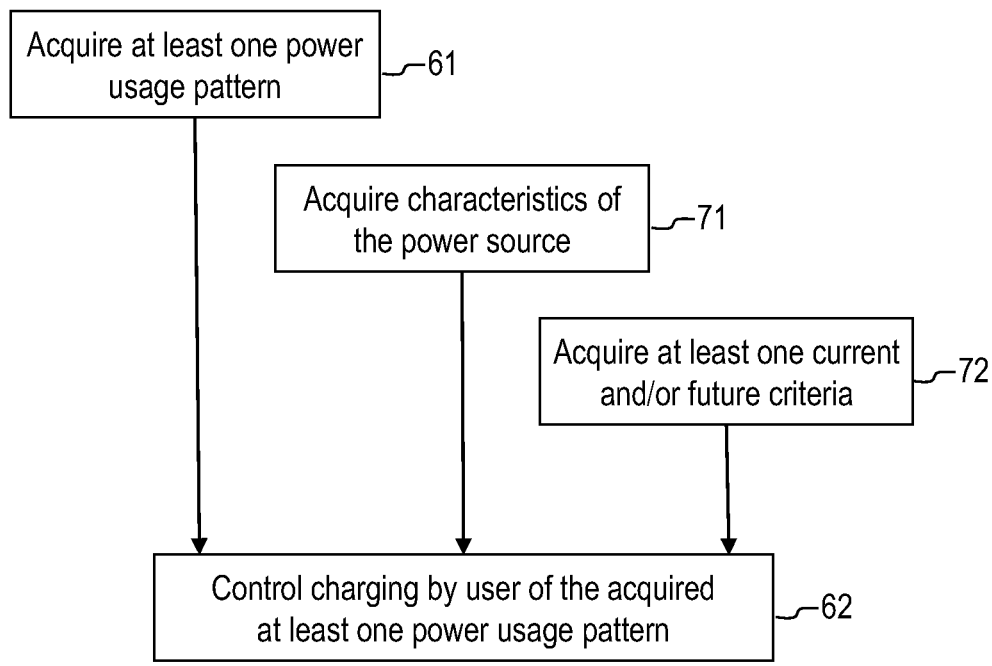
FIG. 7 shows steps or activities executed by a charging controller according to an embodiment of the present invention.

FIG. 7 shows steps or activities executed by charging controller 13 according to an embodiment of the present invention. According to the embodiment of FIG. 7, in addition to the above explained steps 61 and 62, charging controller 13 executes also steps 71 and 72. According to a further embodiment, charging controller 13 is configured to execute only one of steps 71 and 72.

In step 71, charging controller 13 acquires characteristics 21 of the power source to be charged. The acquiring 71 is executed, for example, as explained above. See, for example, FIGS. 2 and 3 and their descriptions.

In step 72, charging controller 13 acquires information on one or more current and/or future criteria 22, 51 to 57 having influence on power usage in the device, power source of which is to be charged. Said criteria 22 correspond, for example, to criteria 51 to 57 described with regard to FIG. 5. Current and/or future criteria 22, 51 to 57 represent criteria that are valid or met currently and/or that are assumed or expected to be valid in the future. Said one or more current and/or future criteria 22, 51 to 57 are detected, for example, from manual, local and/or external data such as: alarms; calendar appointments; weather forecast; road maintenance; current or future location and/or environment; currently executed applications in the device, power source of which is to be charged; and/or future events, applications and/or states of said device etc.

The charging 62 of the power source is then executed in view of the data acquired in steps 61, 71, and 72.

Figure 8:
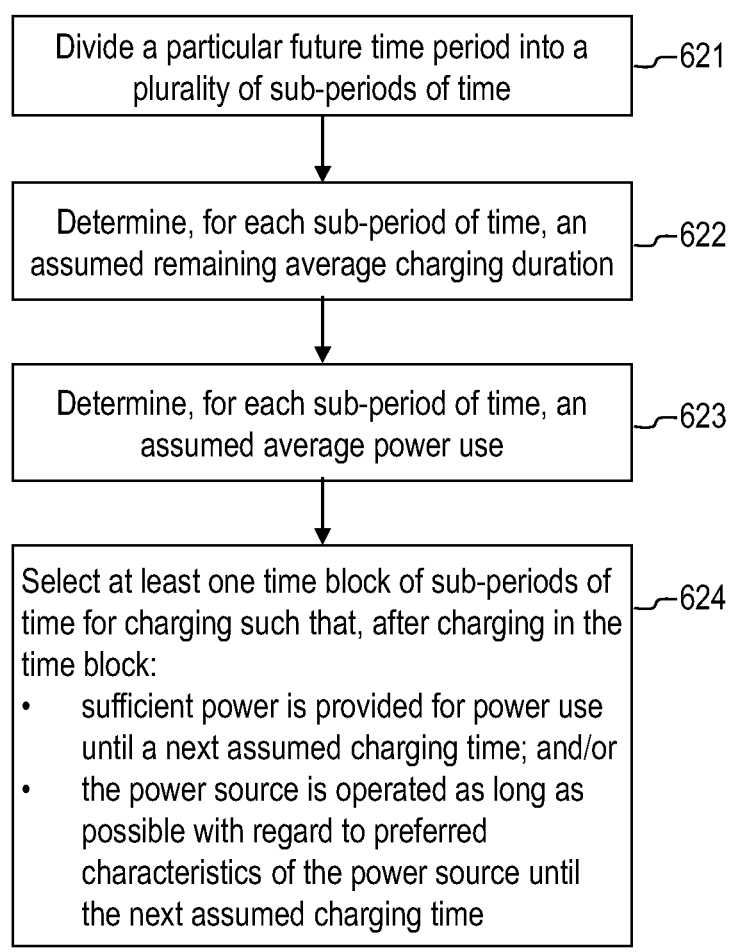
FIG. 8 shows steps or activities executed by a charging controller according to an embodiment of the present invention.

FIG. 8 shows steps or activities executed by charging controller 13 according to an embodiment of the present invention. In particular, FIG. 8 shows sub-steps of charging control step 62 according to an embodiment of the present invention.

When executing charging control 62, a particular future time period is divided into a plurality of sub-periods of time in step 621. The length of the particular future time period to be considered is, according to an embodiment, predetermined. According to an embodiment, the length represents 24 hours. According to an embodiment, the length is defined by a start and an end time. According to a further embodiment, the start time is current time, at which starting of charging is intended. According to an embodiment, the end time is a time, at which starting of a next charging is assumed in view of the at least one acquired power usage pattern 12, i.e. in view of the monitored charging behavior with regard to charging of the power source.

According to an embodiment, the length of the sub-periods is pre-determined. According to an embodiment, the length of the sub-periods is a hour. According to a further embodiment, the sub-periods have the same length.

In step 622, for each sub-period of time, an assumed remaining average charging duration is determined. The assumed remaining average charging duration indicates an assumed or predicted duration that, after a start of charge at a particular charging start time (e.g., current time), remains for charging the power source up to a full level when starting or continuing the charging in the respective sub-period of time. In general, according to an embodiment, the particular charging start time is a time, with regard to which it is assumed or with regard to which is has been predicted that charging will be started at said time. The assumption or prediction is made, for example, in view of the acquired 61 one or more power usage patterns 12 and/or in view of the acquired 72 one or more current and/or future criteria 22, 51 to 57. The determining 622 of the remaining average charging duration is based on previously observed charging behavior(s) in the respective sub-period of time, i.e. on acquired 61 power usage pattern(s) 12 that refer to charging of the power source in the respective sub-period of time. According to a further embodiment, the determining 622 takes into consideration also the acquired 72 information on current and/or future criteria 22, 51 to 57 having influence on power usage in the device and, in particular, on the charging of the power source. The current and/or future criteria 22, 51 to 57 is used for improving the prediction 622 on assumed remaining average charging durations in view of current and/or future (e.g., planned or intended) circumstances.

In step 623, for each sub-period of time, an assumed average power use in the respective sub-period of time is determined. The assumed average power use (e.g., consumption) indicates an assumed or predicted average use (e.g., consumption) of power in the respective sub-period of time. The determining 623 of the average power use is based on previously observed power use behavior(s) in the respective sub-period of time, i.e. on acquired 61 power usage pattern(s) 12 that refer to use, in particular, to consumption of the power source in the respective sub-period of time. According to a further embodiment, the determining 623 takes into consideration also the acquired 72 information on current and/or future criteria 22, 51 to 57 having influence on power usage in the device and, in particular, on the power consumption in the device. The current and/or future criteria 22, 51 to 57 is used for improving the prediction 622 on assumed average power uses (in particular, on assumed average power consumptions) in view of current and/or future (e.g., planned or intended) circumstances.

In step 624, according to the present embodiment, at least one time block of sub-periods of time for charging the power source is selected such that, after charging in the time block, sufficient power is provided for use (in particular, for consumption) by the device until a next assumed charging time. The at least one time block comprises at least one of the sub-periods of time. The selection 624 is based on the assumed remaining average charging duration and on the assumed average power use (e.g., consumption) determined for the respective sub-periods of time. According to an embodiment, a (e.g., each) selected 624 time block comprises consecutive sub-periods of time. The examination, whether sufficient power for use (in particular, for consumption) by the device until a next assumed charging time is provided, is based on consideration of assumed average power use (e.g., consumption) in the time period after the charging in the selected time block and until the next assumed charging time, i.e. based on assumed future average power use (e.g., consumption). According to an embodiment, the assumed future average power use is considered as being sufficient if it is above a particular (e.g., pre-determined) threshold. According to an embodiment, the assumed future average power use is considered as being sufficient if it is within a particular (e.g., pre-determined) range.

According to the present embodiment, in step 624, also the acquired 71 characteristics 21 of the power source to be charged are taken into consideration. Thus, the at least one time block of sub-periods of time for charging the power source is selected also such that, after charging in the time block, the power source is operated as long as possible with regard to preferred characteristics of the power source until the next assumed charging time. The preferred characteristics are, for example, the optimal characteristics of the power source explained above. They comprise at least one of the following: at least one optimal charging range, i.e. a range of charging in which the ageing of the power source is reduced when the power source is operated in said range; at least one charging range that should be avoided, i.e. a range of charging in which the ageing of the power source is accelerated or speeded up when the power source is operated in said range. The preferred characteristics are defined by the acquired 71 characteristics 21 of the power source.

When considering the selection of step 624, the expressions "such that, after charging in the time block, sufficient power is provided for use (in particular, for consumption) by the device until a next assumed charging time" and "such that, after charging in the time block, the power source is operated as long as possible with regard to preferred characteristics of the power source until the next assumed charging time" represent conditions for the selection 624 of an appropriate time block.

Thus, a time block comprising at least one sub-period of time is selected if: after charging in the time block, sufficient power for use (in particular, for consumption) by the device until a next assumed charging time is provided; and/or after charging in the time block, the power source is operated as long as possible with regard to preferred characteristics of the power source until the next assumed charging time.

Hence, in step 624 different time blocks, i.e. different compositions of subsequent sub-periods of time, are considered with regard to at least one of the above mentioned conditions, and at least one best suitable block is selected 624.

Here, it has to be pointed out that only such sub-periods are taken into consideration for building the time blocks, during which the charging of the power source of the device is assumed or expected in view of the at least one acquired 61 power usage pattern 12 and/or the at least one acquired 72 current and/or future criteria 22, 51 to 57. Thus, in step 624, also at least one assumed charging start time is determined or predicted. According to a further embodiment, also a corresponding charging duration, following the respective assumed or predicted charging start time is predicted.

With regard to step 624, according to an embodiment, at least one machine learning method (as generally known) is used for implementing and executing step 624. Known machine learning methods comprise, for example, support vector machines (SVM), gaussian processes regression (GPR) etc. The present invention is not limited to these examples, and use of further appropriate methods is also possible.

In the following, embodiments, implementing the above-explained embodiments in a more concrete way, are presented.

FIG. 9*a* shows 24 sub-periods of time provided with regard to 24 overnight hours. Thus, each sub-period of time represents one hour of the 24 hours. The hours are indicated in the first row of the corresponding tables. The second row of the corresponding tables indicates the assumed remaining average charging duration after charging the power source in the respective hour of sub-period of time respectively. As can be gathered from the second row, the assumed or predicted charging start time time, at which it is expected or assumed that the charging of the power source will be started, is ten o'clock in the evening, i.e. 22:00. The third row of the corresponding tables indicates the assumed average power use (e.g., consumption) during the respective hour or sub-period of time respectively. In embodiment of FIG. 9*a*, the intensity of the power consumption is indicated with regard to a scale from zero to five, wherein zero indicates the lowest power consumption and five indicates the highest power consumption.

According to embodiment of FIG. 9*a*, at four o'clock in the morning, i.e. at 4:00 the (remaining) charging time is expected to be 2 hours if it is assumed or predicted that the charging start time is ten o'clock in the evening, i.e. 22:00.

Given a power source (e.g., battery) with optimal or preferred working/operating conditions when charged between 30% and 80%, the following strategy is determined 624 with regard to a typical day, in which the observed power usage patterns are met. The power source is charged up to its ideal state at around 55% when connected to the charger around 10 o'clock at the evening, i.e. at 22:00, which is the assumed or predicted charging start time according to a power usage pattern 12. Then, power source is left uncharged until 4 o'clock at night and, subsequently, charged up to 80% until 6 o'clock in the morning, i.e. until 6:00 which is deemed enough for the following day until the next assumed charging time at around 10 o'clock at the evening, i.e. at 22:00.

Figure 9B:
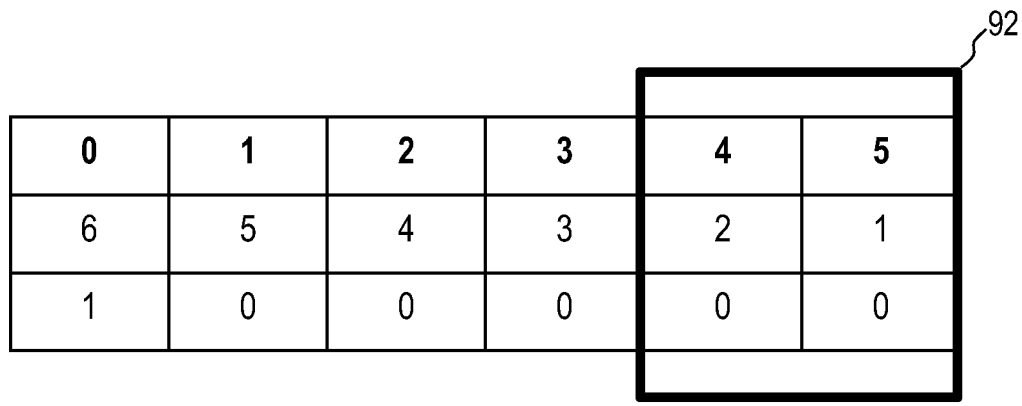
FIG. 9b visualizes a result of a charging time block selection or prediction according to an embodiment of the present invention.
Figure 9B:
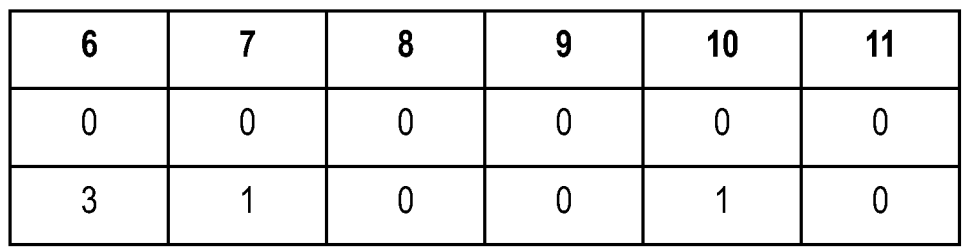
Figure 9B:
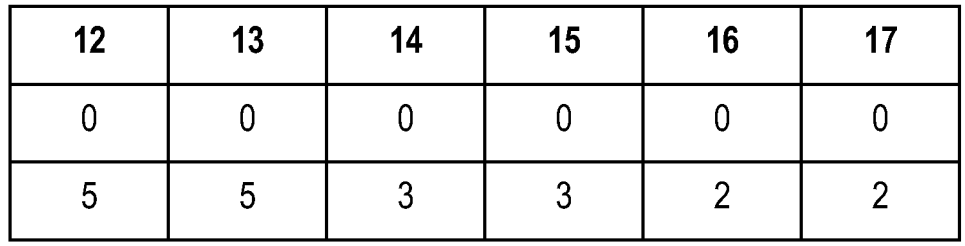
Figure 9B:
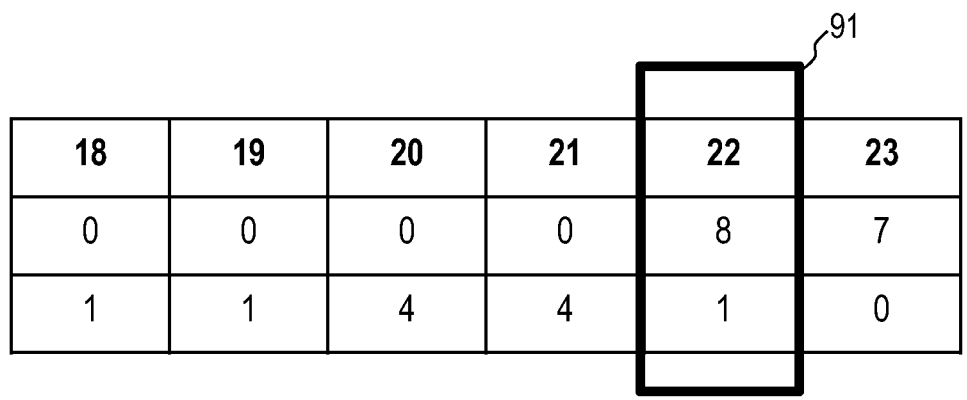

FIG. 9*b* visualizes the result of the charging time block selection or prediction 624 comprising two selected or predicted time blocks 91 and 92. The first time block 91 starts at the charging start time, i.e. at 22:00 and comprises one sub-period of time.

The second time block 92 continues the charging started at 22:00 and comprises two sub-periods of time. In the embodiment of FIGS. 9*a* and 9*b*, it is assumed that charging will be generally executed from 22:00 until 6:00. The assumption is done in view of at least one acquired 61 power usage pattern 12, wherein also at least one acquired 72 current and or future criteria 22, 51 to 57 can be used additionally for determining the assumed charging start time and the assumed charging duration.

As requested by you we now send you an example of prediction for the usage pattern.

Figure 10:
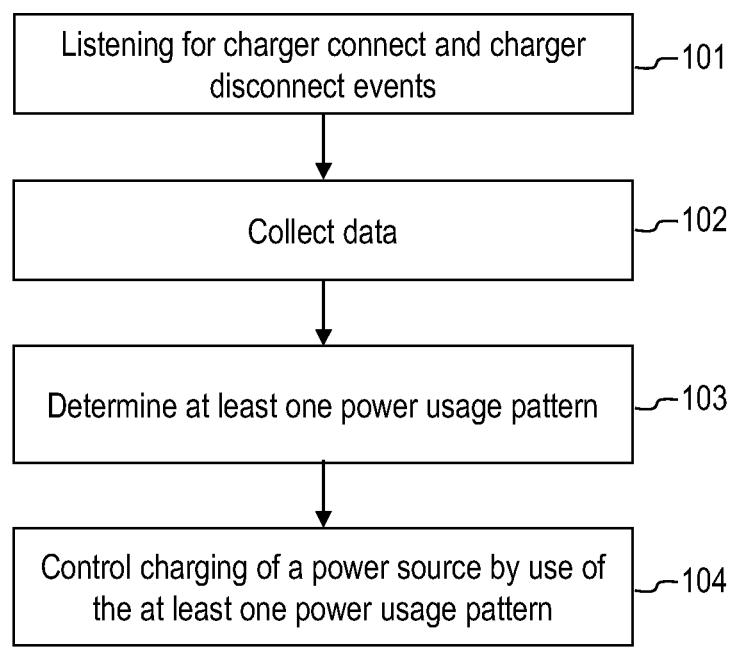
FIG. 10 shows steps executed for charging a power source of a device according to an embodiment of the present invention.

FIG. 10 shows steps executed for charging a power source of a device according to an embodiment of the present invention.

According to the embodiment of FIG. 10, a device, that is powered by a power source like a battery for example, is equipped with sensors that among other things register metrics such as charger connection state and total battery level. The device comprises a software and/or hardware component implementing a signalling mechanism that allows a sending and a reception of messages.

Further, the device comprises a power usage pattern collector 11 and a charging controller 13. Both components 11 and 13 are provided with the aim to predict the length of any upcoming charging periods and to give an estimate on how much power will be sufficient when a charger is later disconnected from the device.

In step 101, the device executes a listening for charger connect and charger disconnect events, i.e. listening whether or not the device has been connected to a charger and whether or not the device has been disconnected from the charger. Further, device executes step 102, in which data collection is executed for determining one or more power usage patterns. Step 102 is executed by power usage pattern collector 11 of the device.

In particular, in step 102, data on the charger connect and charger disconnect events is collected by power usage pattern collector 11 of the device. With regard to charger connect events, the following data or information is collected: charging start time (e.g., hour in the day at which the charging event has been started, wherein 24 hours can be considered); type of day of the start of the charging event (e.g., weekday, weekend, etc.); and/or charging duration (e.g., in minutes). Further, also information or data with regard to no-charging states can be collected, i.e. states at which no charging of the power source of the device is executed, wherein said information or data comprises the following: no-charging start time (e.g., hour in the day that the no-charging event started or a charging event terminated); type of day of the start of the no-charging state (e.g., weekday, weekend, etc); and/or total power usage during the time period of the no-charging state.

In step 103, at least one power usage pattern 12 is determined by power usage pattern collector 11 of the device by use of the collected 101 data. According to the present embodiment, patterns 12 with regard to charging times and no-charging states are determined 103.

In step 104, charging control is executed by use of the at least one pattern 12 determined in step 103. The charging control 104 is executed by charging controller 13 of the device. Here, when a new charging event is started, an average charging duration can be calculated from any previous observations that fit the current conditions (e.g., roughly the same time and same type of weekday). If the duration length is above a certain threshold and deviation is low, i.e., if the majority of the values are close to the average, the value can be deemed good enough. In the same way an average power usage can be calculated from previous non-charging observations starting at about the same time as the predicted charging period will end.

As to the power usage, different metrics for measuring used power can be utilized according to the present invention. Depending on the complexity of one or more sensors that sense the power use by the device with a chargeable power source, the power can be measured in ampere hours (Ah) or watt hours (Wh), for example. Also the type of power source affects, according to an embodiment, which unit metric should be selected for best accuracy. According to an embodiment, the preferred metric is Wh.

If the device is powered from a constant power source, i.e. where the voltage supplied to the device is constant, it does not matter if power is measured in Ah or Wh. Thus, according to an embodiment, any of the metrics Ah or Wh can be used for measuring power used by the device.

If the device is powered with a power source voltage of which changes from a high voltage level to a low voltage level, as it discharges, according to an embodiment, better power measurements will be achieved when Wh is used as a measurement metric, i.e. if the power used by the device is measured in Wh. According to an embodiment, since:

$$Watt=Voltage*Current$$

a decrement in voltage must be compensated by an increase in current and vice versa when executing measurements on used power.

Thus, in view of the aforesaid, present invention concerns charging of a power source of a device. A power usage pattern collector is configured to: collect data on power usage in a device, power source of which is chargeable, with regard to at least one particular criterion having influence on power usage in the device; and determine at least one power usage pattern by use of the collected data, said power usage pattern specifying power usage in the device with regard to at least one particular reoccurring criterion. A charging controller is configured to: acquire at least one power usage pattern; and control charging of a power source of a device by use of the at least one acquired power usage pattern. Present invention relates also to corresponding methods, correspondingly arranged computer program products, correspondingly arranged computer-readable recording media, and a system comprising the power usage pattern collector and the charging controller.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A power usage pattern collector configured to:
   collect data on power usage in a device comprising a chargeable power source with regard to at least one particular criterion having influence on power usage in the device; and
   determine at least one power usage pattern by use of the collected data, said power usage pattern specifying power usage in the device with regard to at least one particular reoccurring criterion.

2. The power usage pattern collector according to claim 1, wherein the at least one particular criterion comprises at least one of the following:
   at least one particular time;
   at least one particular location of a user of the device and/or of the device;
   at least one particular environment of a user of the device and/or of the device;
   at least one particular state of the user of the device and/or of the device;
   at least one particular event of the user of the device and/or in the device;
   at least one particular activity of the user of the device and/or in the device;
   at least one particular charging time;
   at least one particular charging duration;
   time period between two particular charging times;
   power amount consumed between two particular charging times; and/or
   wherein the data on power usage in the device specifies at least one of the following with regard to some or each of the at least one particular criterion having influence on power usage in the device:
   change of used power amount;
   used power amount.

3. The power usage pattern collector according to claim 1, wherein the power usage pattern collector is further configured to at least partially receive the data on power usage in the device from the device and/or from a further device that is external to the device.

4. The power usage pattern collector according to claim 1, wherein the power usage pattern collector is configured to determine at least one power usage pattern by:
   determining at least one reoccurring criterion in the collected data on power usage in a device; and
   generating the at least one power usage pattern for an individual reoccurring criterion or for a group of interrelated reoccurring criteria.

5. The power usage pattern collector according to claim 4, wherein the power usage pattern collector is further configured to generate a group of interrelated reoccurring criteria if at least two reoccurring criteria are detected as influencing together the power usage in the device.

6. The power usage pattern collector according to claim 1, wherein a criterion is determined as a reoccurring criterion if the criterion has essentially the same influence on power usage in the device with each reoccurrence.

7. A method for power usage pattern collecting, said method comprising steps of:
   collecting data on power usage in a device comprising a chargeable power source with regard to at least one particular criterion having influence on power usage in the device; and
   determining at least one power usage pattern by use of the collected data, said power usage pattern specifying power usage in the device with regard to at least one particular reoccurring criterion.

* * * * *